Feb. 2, 1965    R. C. YAMA    3,168,356
ROTARY BEARING
Filed Aug. 2, 1962
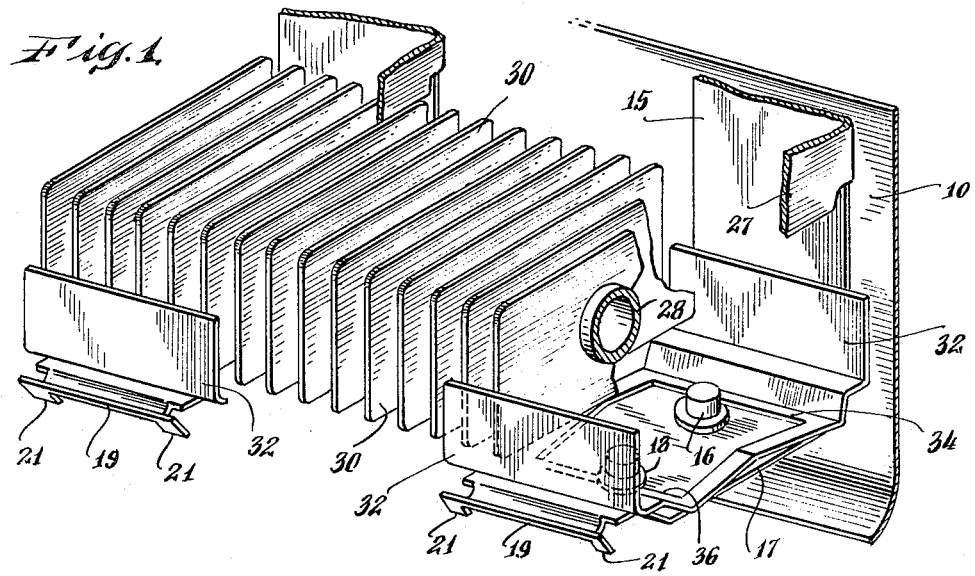
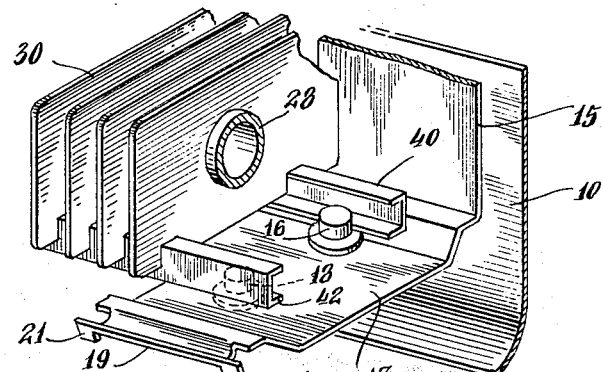
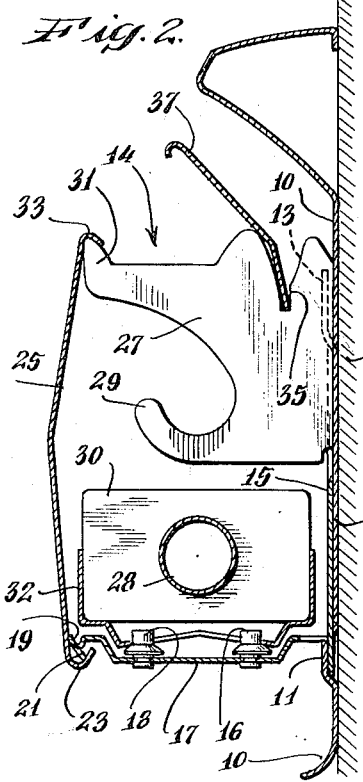
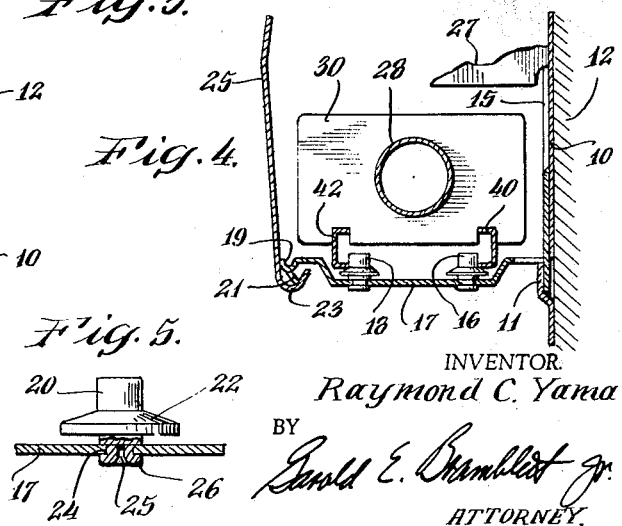
INVENTOR.
Raymond C. Yama
BY
ATTORNEY.

United States Patent Office 3,168,356
Patented Feb. 2, 1965

3,168,356
ROTARY BEARING
Raymond C. Yama, North Coventry, Conn., assignor to Argo Industries, Incorporated, Hartford, Conn., a corporation of Connecticut
Filed Aug. 2, 1962, Ser. No. 214,392
4 Claims. (Cl. 308—6)

This invention relates to a novel rotary bearing and, more particularly, to such a bearing for use in a radiator heating assembly.

The hot water baseboard heater is widely used in the construction industry. Radiators of this type are highly efficient and are very useful for obtaining maximum efficiency in heat transfer into residential construction. However, various problems have arisen with such radiators due to the presence of noise caused by expansion and contraction as the heated fluid flows into the assembly and as the assembly cools. The noise arises because of the repositioning of the finned pipe or heating tube, with respect to the brackets, hangers, and other fixtures that are normally employed to secure the radiating element to the walls of the dwelling.

One common method used for supporting prior art heating tubes is to utilize projecting hooks extending between adjacent fins into which the tube is positioned. With this arrangement, the tube must expand and contract against the friction created by the hooks. Further, movement is limited to the distance between adjacent fins, noise may result from contact between the fins and the hook, and the tube may slip completely out of the hook.

Various alternatives have been proposed to overcome these disadvantages but each solution has had difficulties of its own. One such solution has been to utilize a "cradle" extending between adjacent fins in which the tube is allowed to rest. The cradle includes a horizontal section having a short raceway which rests on balls. The balls, in turn, rest in a second short raceway provided in a horizontal bracket shelf. Not only is longitudinal movement still limited when utilizing this technique, but the fins are free to contact the cradle. Further, a stud is required to maintain the proper spacing between the upper and lower raceways to prevent the balls from falling out. The stud creates additional friction.

Another solution has been to employ horizontal rollers having sufficiently large diameters to permit successive fins to ride over them. The undesirable friction and noise as the fins pass over the rollers will be apparent.

It is, therefore, a primary object of the present invention to provide an improved bearing assembly.

Another object of this invention is to provide an improved baseboard radiator assembly.

Another object of this invention is to provide such an assembly wherein the normal expansion and contraction of the radiator assembly does not result in objectionable noise.

Another object of this invention is to provide such an assembly wherein the finned tube is maintained a fixed distance from a wall.

Other objects, features and advantages of this invention will be apparent from the following description, the appended claims and the figures of the attached drawing, wherein:

FIG. 1 is a perspective view of one embodiment of this invention;

FIG. 2 is an end view of the apparatus shown in FIG. 1;

FIG. 3 is an illustration of a modification of this invention;

FIG. 4 is an end view of the apparatus shown in FIG. 3; and

FIG. 5 is an enlarged elevational view of the rotary perpendicular bearing of the invention.

The objects of this invention are achieved by means of a novel rotary bearing. The bearing comprises a cylindrical member mounted substantially at one end for rotation about its longitudinal axis. The bearing includes a flange essentially perpendicular to the axis of rotation. Both the cylindrical surface and the flange are adapted to serve as simultaneous load bearing members.

A baseboard radiator assembly incorporating the novel rotary bearing is illustrated in FIGS. 1 and 2. A rear panel 10 is secured to a wall 12 by means of nails or other fastening devices (not shown) attached to the wall studs. A hanger 14 is then secured to the rear panel 10 by means of tabs 11, 13 in the usual fashion well known to those skilled in this art. These hangers may be installed at intervals of one to three feet along the length of the rear panel. The spacing between the hangers depends upon the length of tubing to be installed.

Hanger 14 is customarily made of sheet metal cut and bent to the illustrated configuration. A vertical portion 15 is designed to lie flat against rear panel 10. The bottom portion is bent to form a horizontal shelf 17. The end of shelf 17 farthest from panel 10 is shaped to form a spring latch 19 having downwardly extending tabs 21 which hook into a lower curved edge 23 of front panel 25.

Another portion of hanger 14 is also bent to lie at right angles to rear panel 10. This portion lies in a vertical plane, however, and forms a bracket 27. Bracket 27 includes a hook 29 which is used in the prior art to support the finned heating tube. Bracket 27 also includes a finger 31 which supports the upper curved edge 33 of front panel 25. Bracket 27 may also include a notch 35 for supporting a heat deflector 37.

In the apparatus of this invention, hook 29 is not employed and may be omitted, if desired. The apparatus so far described is that normally employed in prior art baseboard radiators and does not define my invention. The improvement of my invention will now be more particularly described.

In accordance with this invention, the finned tube heating assembly is supported, not by hook 29, but by a support fixture carried by horizontal shelf 17 and movable relative thereto by novel rotary perpendicular bearings.

The rotary perpendicular bearings 16, 18 of this invention are vertically mounted on shelf 17 and are displaced from one another in a direction perpendicular to the wall 12. Each bearing will be seen to comprise a cylindrical portion 20, a first flanged portion 22, a reduced section 24 which extends through a matching hole in shelf 17 and is secured by a second flanged portion 26. The finned heating tube assembly comprising the tube 28 and fins 30 is cradled in support fixture 32 which is designed to hold the finned tube assembly in a closed fitting relationship. Fixture 32 is designed with a rectangular cut-out portion including horizontally extending edges 34 and 36 which abut against the cylindrical portions 20 of bearings 16 and 18. It is important to note that each of bearings 16 and 18 is free to rotate relative to shelf 17. As fixture 32 is unrestrained, with the exception of the restraint imposed by bearings 16 and 18, the fixture is able to move longitudinally as tube 28 expands and contracts. As fixture 32 moves, bearings 16 and 18 will rotate to accommodate the expansion and contraction of tube 28. It will also be apparent that bearings 16 and 18 and edges 34 and 36 are designed to prevent movement to and from the wall 12. The flange 22 of each bearing provides vertical support for fixture 32 while the cylindrical portion 20 prevents sideways motion and maintains tube 28 a fixed distance from rear panel 10 and wall 12.

A modification of this invention is shown in FIGS. 3 and 4. In these illustrations it is to be noted that the finned tube assembly is mounted on rails 40, 42. In the illustrated embodiment, these rails are in the form of channels mounted vertically. The channels extend through holes of proper size cut in the various fins of the finned tube assembly. The lower portion of each channel abuts against the cylindrical edge 20 of each perpendicular bearing 16 and 18 in the same fashion as the edges 34 and 36 of FIGS. 1 and 2.

FIG. 5 illustrates, in more detail, the construction of a bearing of this invention. The illustrated bearing is made of steel with a copper flash finish. In the bearing as initially formed, the reduced section 24 is elongated and forms a lower stem. This lower stem is partially hollowed by a hole 25. This stem is inserted through the hole in shelf 17 and its lower portion is then rolled over the lip of the hole by a riveting machine to form lower flanged portion 26.

A number of improvements over the prior art have been obtained by means of this invention. Longitudinal movement is unlimited. Furthermore the members are maintained a fixed distance from a reference point, such as a wall, and no objectionable noise can arise from expansion and contraction of tube 28.

Many other variations and modifications of this invention will be apparent to those skilled in the art. For example, although a tapered shoulder has been indicated on the bearings of this invention it is not necessary that they need be in fact so limited. Such a shoulder may be horizontal for example. Furthermore, it is not necessary that the entire cylindrical and shoulder portions of the bearing be of one element. Rather, the shoulder may be separately constructed and may even be rotatable relative to the cylindrical portion of the bearing. Furthermore, it is not necessary that the bearing be fixed relative to the wall, but the bearing may in fact be carried by the longitudinally moving portion while the horizontal edge is fixed.

It is to be understood, therefore, that the foregoing description is to be understood as illustrative only, rather than limiting. This invention is limited only by the scope of the following claims.

1. A bearing assembly which comprises a base; a substantially cylindrical member having a first end and a second end, said cylindrical member being vertically mounted on said base substantially solely at said first end for rotation about its longitudinal axis; flange means extending outwardly from said cylindrical member positioned such that the intersection of a surface thereof with a plane perpendicular to said longitudinal axis is a circle, the cylindrical surface of said cylindrical member and the surface of said flange means each being adapted to serve as simultaneous load supporting surfaces; and a load member having an elongated rail member abutting at least one of said supporting surfaces for movement relative thereto and perpendicular to said longitudinal axis.

2. A bearing assembly which comprises a base; first and second substantially parallel cylindrical members, each having a first end and a second end and being mounted on said base substantially solely at said first end for rotation about its longitudinal axis; flange means on each cylindrical member extending outwardly therefrom and positioned such that the intersection of a surface thereof with a plane perpendicular to said longitudinal axis is a circle, each of the surface of said flange means and the cylindrical surface of each member being adapted to serve as simultaneous load supporting surfaces; a load having at least two parallel elongated rail members, each of said rail members abutting at least one supporting surface of a different cylindrical member for movement relative thereto and perpendicular to their longitudinal axes.

3. The apparatus of claim 2 wherein said elongated rail members are parallel to one another.

4. The apparatus of claim 3 wherein said elongated rail members lie in a common plane substantially perpendicular to said longitudinal axes.

References Cited by the Examiner
UNITED STATES PATENTS

| | | | |
|---|---|---|---|
| 1,172,582 | 2/16 | Chittenden | 248—234 |
| 1,476,473 | 12/23 | Skinner | 248—55 |
| 1,952,361 | 3/34 | Buckley | 237—70 |
| 2,584,914 | 2/52 | Paternoster | 237—70 |
| 2,715,003 | 8/55 | Powell | 248—232 X |
| 2,880,040 | 3/59 | Gomersall | 308—3.8 |
| 2,898,159 | 8/59 | Arnit | 308—318 |

ROBERT C. RIORDON, *Primary Examiner.*

MILTON KAUFMAN, *Examiner.*